United States Patent
Varley et al.

(10) Patent No.: US 9,834,379 B2
(45) Date of Patent: Dec. 5, 2017

(54) METHOD, DEVICE AND SYSTEM FOR PICKING ITEMS IN A WAREHOUSE

(71) Applicant: SYMBOL TECHNOLOGIES, INC., Lincolnshire, IL (US)

(72) Inventors: Jordan K. Varley, Mississauga, NY (US); Jaeho Choi, Whitestone, NY (US); Mark Thomas Fountain, London (GB); Kevin B. Mayginnes, Schaumburg, IL (US); James Morley-Smith, High Wycombe (GB)

(73) Assignee: Symbol Technologies, LLC, Holtsville, NY (US)

( * ) Notice: Subject to any disclaimer, the term of this patent is extended or adjusted under 35 U.S.C. 154(b) by 226 days.

(21) Appl. No.: 14/580,448

(22) Filed: Dec. 23, 2014

(65) Prior Publication Data

US 2016/0176635 A1    Jun. 23, 2016

(51) Int. Cl.
| | |
|---|---|
| *G06F 7/00* | (2006.01) |
| *B65G 1/137* | (2006.01) |
| *G05B 15/02* | (2006.01) |
| *G06Q 10/08* | (2012.01) |

(52) U.S. Cl.
CPC ............ *B65G 1/137* (2013.01); *G05B 15/02* (2013.01); *G06Q 10/087* (2013.01)

(58) Field of Classification Search
USPC ........................................................ 700/216
See application file for complete search history.

(56) References Cited

U.S. PATENT DOCUMENTS

| | | |
|---|---|---|
| 6,633,315 B1 | 10/2003 | Sobeski et al. |
| 6,668,177 B2 | 12/2003 | Salmimaa et al. |
| 8,712,686 B2 | 4/2014 | Bandyopadhyay et al. |
| 2004/0117276 A1 | 6/2004 | Kettler et al. |
| 2004/0138781 A1 | 7/2004 | Sacks et al. |
| 2004/0181467 A1* | 9/2004 | Raiyani ............... G06Q 10/087 705/28 |
| 2004/0249821 A1 | 12/2004 | Nies et al. |

(Continued)

FOREIGN PATENT DOCUMENTS

| | | |
|---|---|---|
| EP | 1801746 A1 | 6/2007 |
| EP | 1382129 A | 10/2009 |

OTHER PUBLICATIONS

International Search Report and Written Opinion for corresponding International Patent Application No. PCT/US2015/061886 dated Feb. 16, 2016.

*Primary Examiner* — Kyle Logan

(57) ABSTRACT

A method, device and system for picking items in a warehouse a method of controlling picking of items in a warehouse is provided. The method comprises: receiving, at processor of a mobile device, using a communication interface of the mobile device, location sensitive data associated with at least one item to be picked within the warehouse, the mobile device comprising the processor, the communication interface and a display; and, rendering, at the display using the processor, instructions for picking the at least one item in the warehouse, the instructions including the location sensitive data, the instructions updated to emphasize different subsets of the location sensitive data based on a current location of the mobile device relative to a location of the at least one item in the warehouse.

23 Claims, 11 Drawing Sheets

(56) References Cited

U.S. PATENT DOCUMENTS

2010/0121480 A1\* 5/2010 Stelzer .................. B65G 1/137
  700/215
2014/0267776 A1\* 9/2014 Duthu .................. G06Q 10/087
  348/169
2014/0336814 A1 11/2014 Moore et al.

\* cited by examiner

METHOD, DEVICE AND SYSTEM FOR PICKING ITEMS IN A WAREHOUSE

BACKGROUND OF THE INVENTION

Warehouse picking requires a user (i.e. a picker) to travel to a number of discrete locations to collect (i.e. "pick") items and complete a "pick task". Information on the pick locations and items can be presented at a display in single text lines for each pick or a text list of upcoming picks can be given. However, such methods of presenting pick information prevent the PICKER from optimizing their pick efficiency and still rely on various levels of cognitive load based on a picker's experience, for example knowledge of locations of item in a warehouse. Given how demanding the tasks of a picker can be, with often more than one hundred picks occurring in an hour, and given the high turnover rate of pickers, as well as the high usage of seasonal workers in warehouses, warehouse inefficiencies in picking can be considerable.

Such inefficiencies can include: pick carts not being optimally placed between close picks to reduce wasted travel time; and pickers spending cognitive load on determining if the pick is on a left or right side of an aisle and/or decoding the location code in other ways (e.g. shelf height). In addition, item placement in bins/totes/cart shelves/palette may be inefficient due to the picker not knowing what the next pick is (perhaps a large item is located in a in a top of a tote when it should not be). Hence, especially novice pickers may get confused trying to figure out the layout of the warehouse and/or locations of items therein Indeed, order picking often consumes a large part of total labor operations in a warehouse, for example up to 10%.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
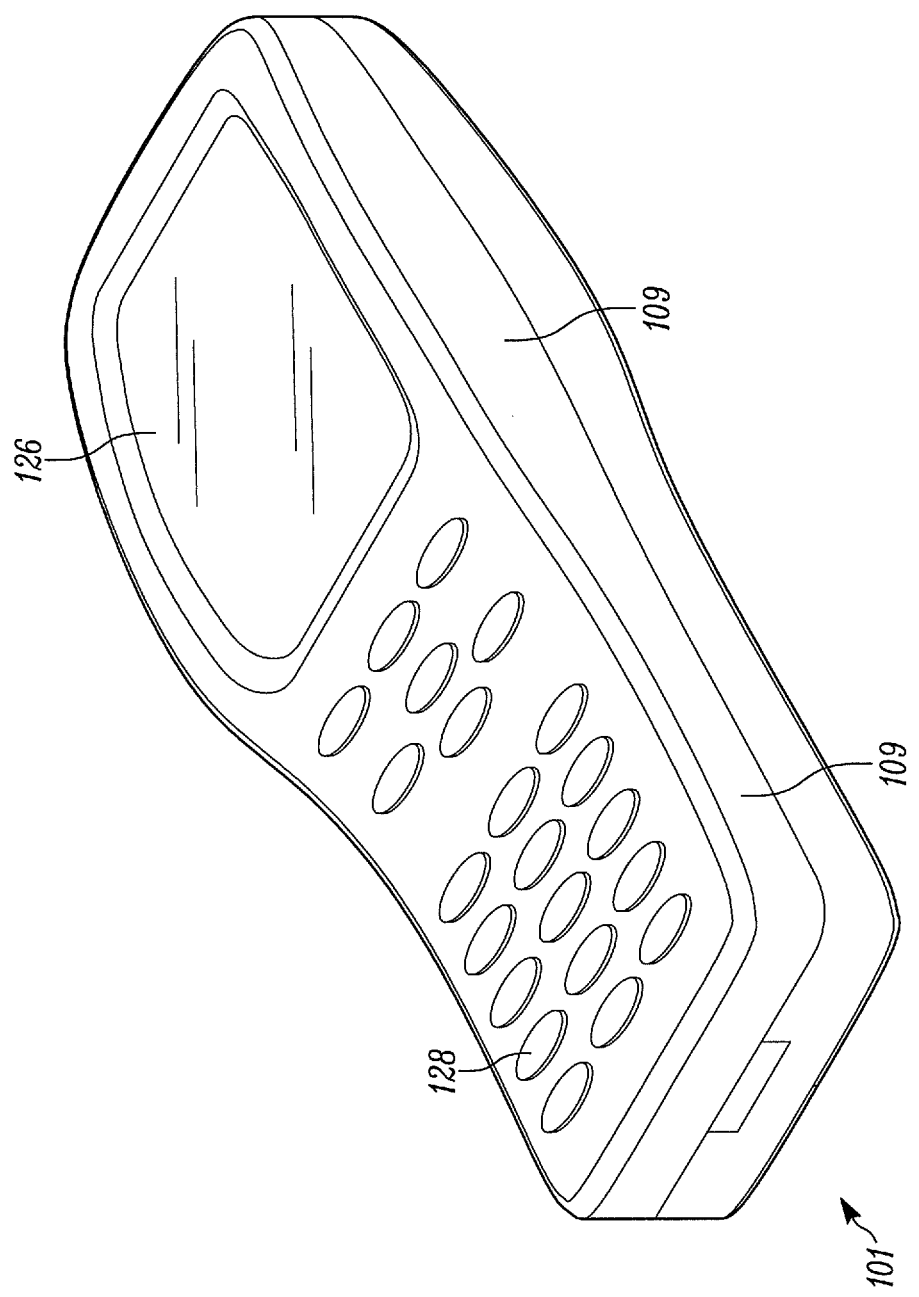
FIG. 1 is a perspective view of a picking device, in accordance with some embodiments.

Skilled artisans will appreciate that elements in the Figures are illustrated for simplicity and clarity and have not necessarily been drawn to scale. For example, the dimensions of some of the elements in the Figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device, system and method of controlling picking of items in a warehouse. The method comprises: receiving, at processor of a mobile device, using a communication interface of the mobile device, location sensitive data associated with at least one item to be picked within the warehouse, the mobile device comprising the processor, the communication interface and a display; and, rendering, at the display using the processor, instructions for picking the at least one item in the warehouse, the instructions including the location sensitive data, the instructions updated to emphasize different subsets of the location sensitive data based on a current location of the mobile device relative to a location of the at least one item in the warehouse.

Figure 2:
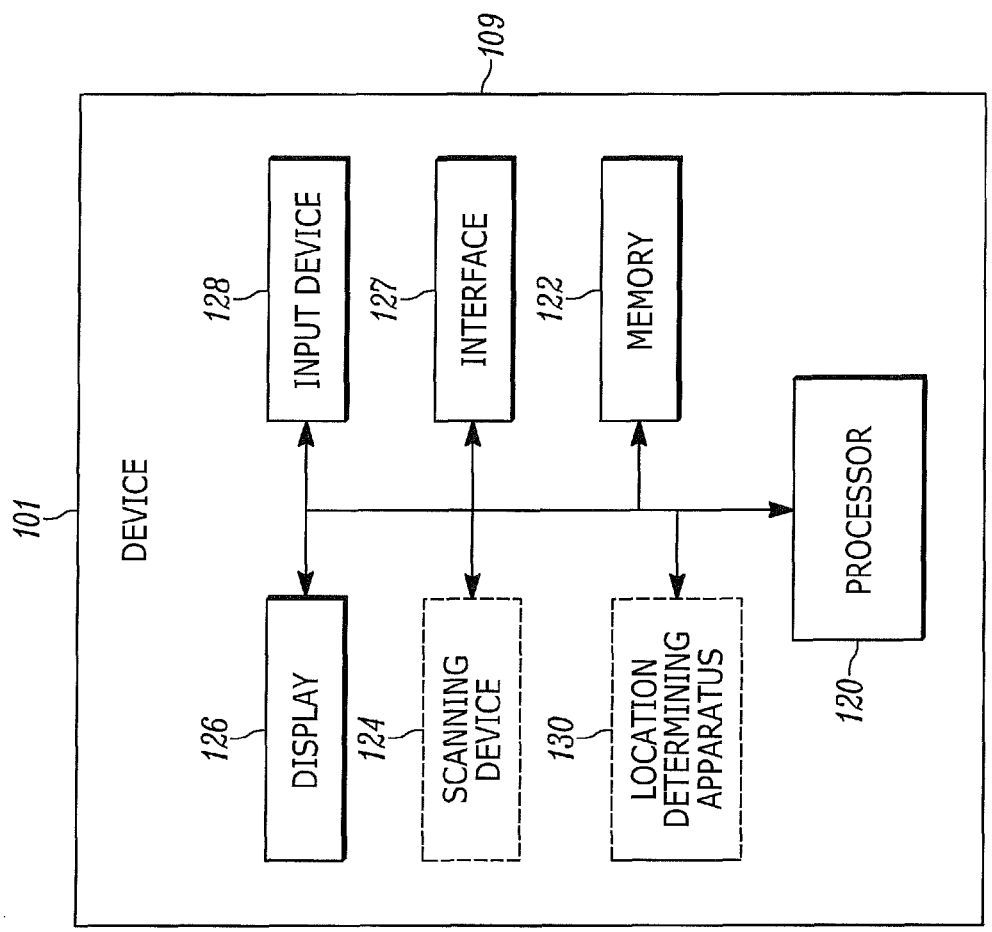
FIG. 2 is a schematic block diagram of the device of FIG. 1, in accordance with some embodiments.

Attention is next directed to FIGS. 1 and 2 which respectively depict a front perspective view and a schematic block diagram of a mobile device 101 comprising: a housing 109; a processor 120; a memory 122; an optional scanning device 124; a display 126; a communication interface 127 (interchangeably referred to hereafter as interface 127); an input device 128 and an optional location determining apparatus 130. As will be explained in further detail hereafter, processor 120 is configured to: receive, using interface 127, location sensitive data associated with at least one item to be picked within a warehouse; and, render, at display 126, instructions for picking the at least one item in the warehouse, the instructions including the location sensitive data, the instructions updated to emphasize different subsets of the location sensitive data based on a current location of the mobile device relative to a location of the at least one item in the warehouse. While only an exterior of device 101 is depicted in FIG. 1, it is assumed that all components of device 101 are present in both FIGS. 1 and 2.

Device 101 can be any type of electronic device that can be used in a self-contained manner, for example, to gather data. Device 101 can hence include, but is not limited to, any suitable combination of electronic devices, data gathering devices, laptop computers, portable electronic devices, mobile computing devices, portable computing devices, tablet computing devices, laptop computing devices, and the like. Other suitable devices are within the scope of present implementations. However, It should be emphasized that the structure of device 101 in FIGS. 1 and 2 is purely an example, and contemplates a device that can be used for scanning and/or gathering data, but that other devices are within the scope of present implementations, for example others devices that can be used for specialized functions, including, but not limited, to one or more of, telephony, computing, and the like.

Furthermore, while device 101 is depicted in the form of a handheld scanning device, in other implementations, device 101 can comprise a wearable device and/or a wearable form factor, including, but not limited to a heads-up display ("HUD"), a head mounted device, a chest mounted device, an arm mounted device, a hand mounted device, and the like.

Depicted non-limiting implementations of device 101 are next described with reference to FIGS. 1 and 2.

Processor 120 runs or executes operating instructions and/or programs, which are stored in memory 122, to perform various functions for the device 101 and to process data. Processor 120 can include one or more microprocessors, microcontrollers, digital signal processors (DSP), state machines, logic circuitry, and/or any device or devices that process information based on operational or programming instructions stored in memory 122. In particular, processor 120 can comprise a hardware processor. Memory 122 can comprise any suitable combination volatile memory and non-volatile memory including, but not limited to random access memory, a hard drive, a flash drive, a solid state drive and the like.

Depending on the implementation of the embodiment, the display 126 can be realized as a liquid crystal display (LCD), a touch-sensitive display, a cathode ray tube (CRT), a light emitting diode (LED) display, an organic light emitting diode (OLED) display, a plasma display, a projection display, or another suitable electronic display.

Communication interface 127, which is interchangeably referred to hereafter as interface 127 is configured to exchange data with one or more remote devices using a communication network, and/or receive data from one or more remote devices using a communication network and/or transmit data to one or more remote devices using a communication network. Interface 127 is hence generally configured to communicate with one or more communication networks including, but not limited to, wired networks, wireless networks, cell phone networks (including various implementations thereof), WiFi networks, the Internet and the like. Indeed, in particular non-limiting implementations, as depicted, device 101 comprises a portable wireless device and hence interface 127 comprises a wireless communication interface.

At least one input device 128 is generally configured to receive input data, and can comprise any suitable combination of input devices, including but not limited to a keyboard (as depicted), a keypad, a pointing device, a mouse, a track wheel, a trackball, a touchpad, a touch screen, ring scanners and voice input devices (so that voice input can be received and device 101 operated in a hands-free mode) and the like. Other suitable input devices are within the scope of present implementations.

Device 101 can further comprise, but is not limited to, a scanning device 124 which can be used to gather data (which can be located at a rear of device 101 and hence is not visible in FIG. 1), for example from barcodes and the like that identify items within a warehouse. Hence, scanning device 124 can include, but is not limited, a laser scanning device, a barcode scanner, an optical scanner and the like.

Device 101 can further comprise, but is not limited to, a location determining apparatus 130 which can be used to determine a location of device 101, for example in a warehouse. Location determining apparatus 130 can comprise one or more of a Global Positioning System (GPS) device, a device which interacts with external global positioning devices including, but not limited to, an RFID (radio-frequency identification) tag reader, a Bluetooth™ Low Energy ("BTLE") tag reader, an ultrasonic locationing device, a WiFi triangulation device and the like. For example, BTLE tags can be placed at intervals in a warehouse, and apparatus 130 can interact and/or read the BTLE tags to both provide an indication of device 101 moving within the warehouse and/or a location of device 101 within the warehouse. Such BTLE tags can also be used to identify when device 101 is in a given zone and/or within proximity of an item. Ultrasonic locationing can give an indication of position within an area (e.g. a set of co-ordinates for location in a warehouse); such position data can be processed at processor 120 to infer motion and identify items proximal device 101. With Wi-Fi triangulation, apparatus 130 interacts with WiFi access points in a warehouse to an approximate set of coordinates for a location of device 101, which can be used in a similar way to the ultrasonic data. Furthermore, coordinates and/or position data and/or location data can be provided in absolute coordinates (e.g. GPS coordinates, longitude/latitude and the like) or relative coordinates, for example coordinates determined with reference to a warehouse.

While not depicted, device 101 can further include a power supply, a power store, a battery, and the like. While also not depicted, device 101 can further include a speaker and/or microphone (e.g. as a voice input device).

Furthermore, device 101 can be configured to determine one or more of ambient temperature, light, time of day, and the like, using, respectively, one or more temperature devices, one or more light sensitive devices, and one or more clock devices; such devices can be measured and/or tracked to assist with providing instructions for picking items.

In any event, it should be understood that a wide variety of configurations for device 101 are contemplated.

Figure 3:
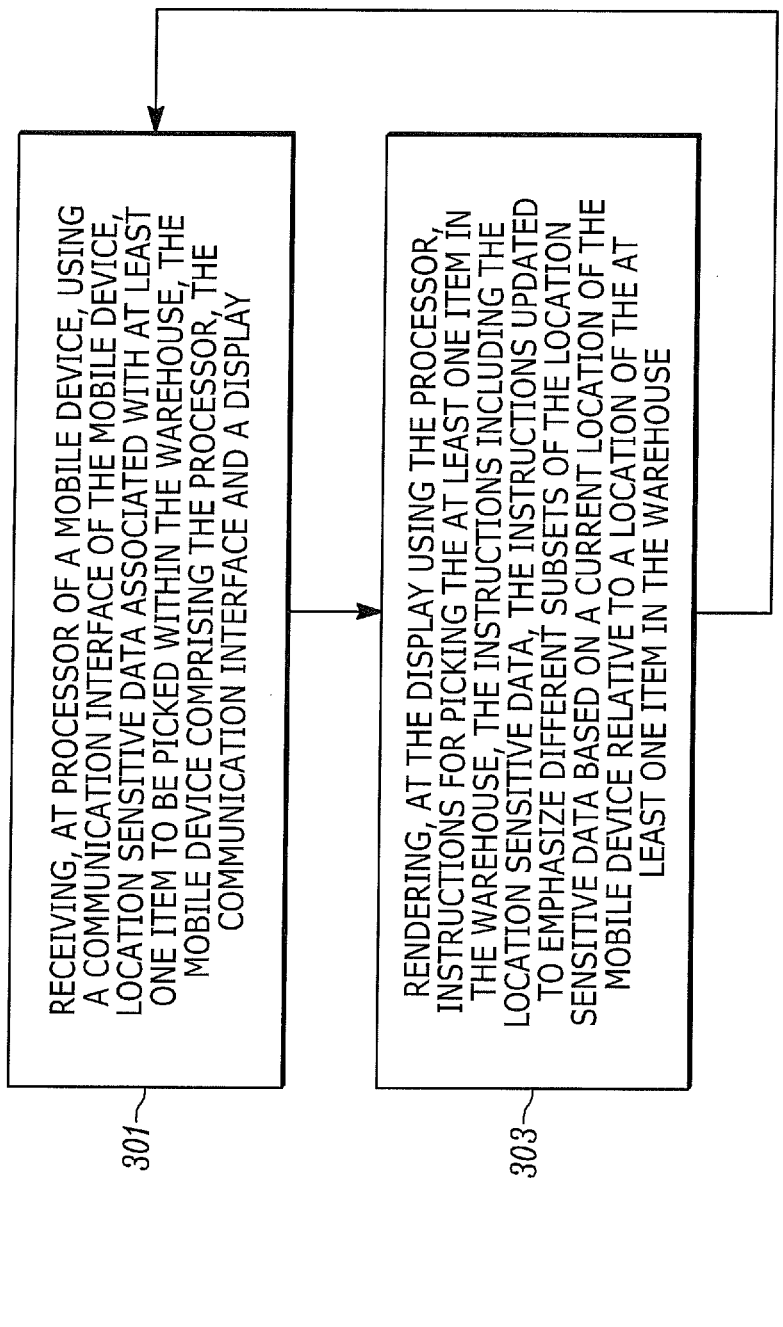
FIG. 3 is a block diagram of a flow chart of a method for picking items, in accordance with some embodiments.

Attention is now directed to FIG. 3 which depicts a flowchart of a method 300 for picking items in a warehouse, according to non-limiting implementations. In order to assist in the explanation of method 300, it will be assumed that method 300 is performed using device 101, and specifically by processor 120 of device 101. Indeed, method 300 is one way in which device 101 can be configured. Furthermore, the following discussion of method 300 will lead to a further understanding of device 101, and its various components. However, it is to be understood that device 101 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of device 101 as well.

At block 301 processor 120 receives, using interface 127, location sensitive data associated with at least one item to be picked within a warehouse; and, At block 303, processor 120 renders, at display 126, instructions for picking the at least one item in the warehouse, the instructions including the location sensitive data, the instructions updated to emphasize different subsets of the location sensitive data based on a current location of the mobile device relative to a location of the at least one item in the warehouse.

Blocks 301, 303 can occur in parallel, and further can occur repeatedly and in any order once initial location sensitive data is received at a first occurrence of block 301.

Method 300 can further comprise processor 120 determining the current location of mobile device 101 by one or more of: receiving the current location from location determining apparatus 130 (when present at device 101); and, receiving, using interface 127, the current location from a external location determining apparatus, for example GPS system, an external location determining apparatus, and the like. A current location of device 101 can be determined periodically, for example to track, in real time, a location of device 101 within a warehouse as device 101 is carried within the warehouse and/or is moved around in the warehouse.

The location sensitive data associated with at least one item can comprise a location of the at least one item in the warehouse, and method 300 can further comprise processor 120 determining the location of the at least one item in the warehouse by processing the location sensitive data.

As will be described in more detail below, each subset of the location sensitive data can be associated with a respective threshold difference between the current location of device 101 and the location of the at least one item in the warehouse, the instructions updated to emphasize a respective subset of the location sensitive data when a current difference between the current location of the mobile device and the location of the at least one item in the warehouse is between a the respective threshold difference and a next threshold difference of a next subset.

Further, at block 303, the instructions can be updated to emphasize different subsets of the location sensitive data at display 126, based on a current location of the mobile device relative to a location of the at least one item in the warehouse by one or more of: changing a size of a emphasized subset to be larger than a size of remaining subsets rendered at the display; changing a font size of the emphasized subset to be larger than a font size of the remaining subsets rendered at the display; and rendering the emphasized subset in a about a center the remaining subsets rendered at the display. In some of these implementations, at block 303, the instructions can be further updated to emphasize different subsets of the location sensitive data at display 126 based on a workflow step, as described in more detail below.

Method 300 can further comprise, at block 303, processor 120 rendering a progress bar at display 126, the progress bar updated to indicate one or more of: a relative distance between the current location of device 101 and the location of the at least one item in the warehouse; and tracking progress of the picking of the at least one item in the warehouse.

Method 300 can further comprise, at block 303, processor 120, when the at least one item being picked comprises two or more items at a same location, and when the current location is within a threshold distance of the same location, rendering at display 126 a count of a number of the two or more items that are remaining to be picked at the same location.

Method 300 can further comprise, at block 303, processor 120 rendering the instructions at the display in a card format.

Method 300 can further comprise, at block 303, and/or in conjunction with block 301, and/or before block 303 and/or after block 301, processor 120, prior to rendering the instructions, rendering at display 126 a list of the items to be picked in a picking order, each of the items in the list rendered in a size that depends on a number of the items located at a same location.

Method 300 will now be described with reference to FIGS. 4 to 10.

Figure 4:
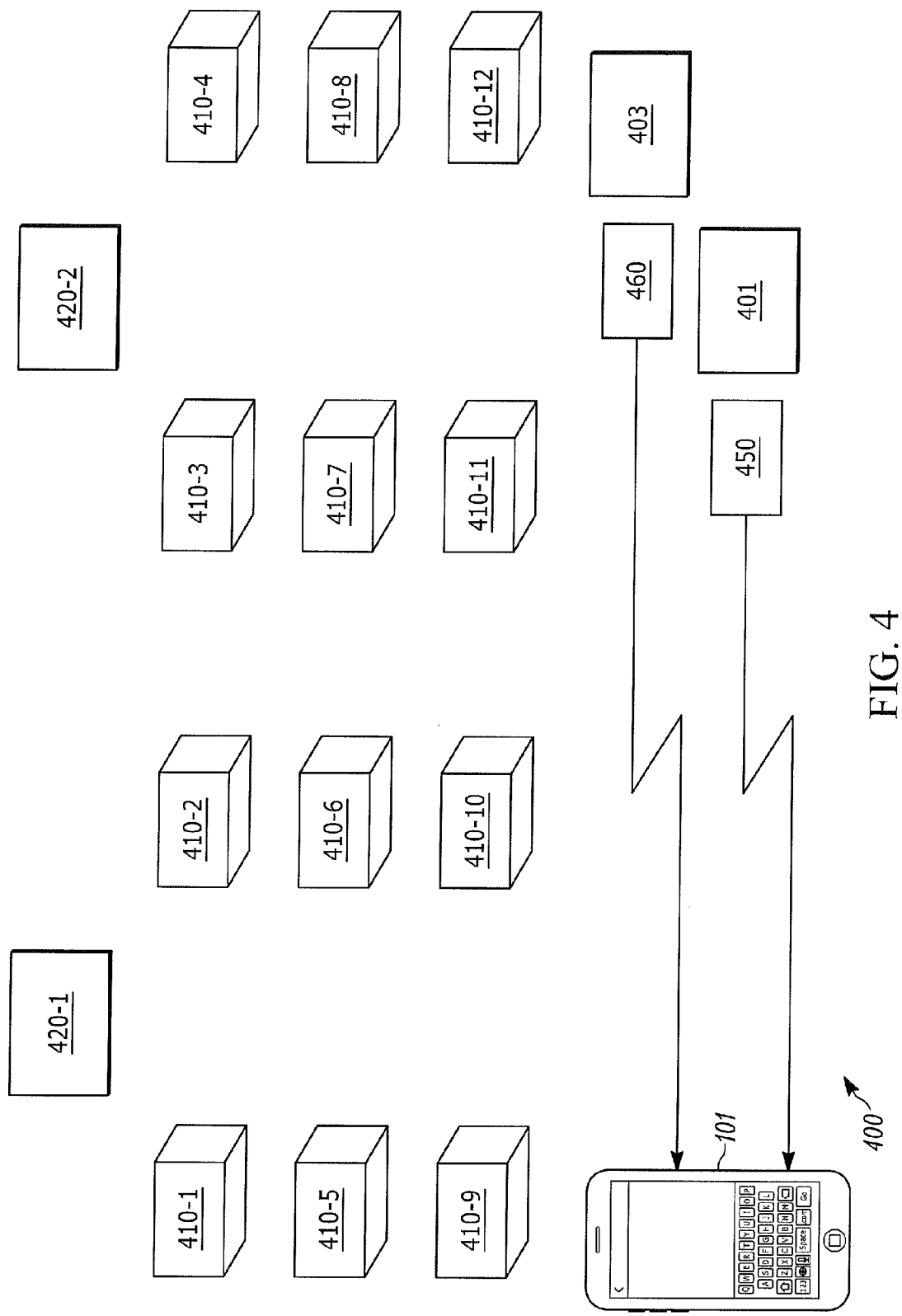
FIG. 4 is a schematic view of a system for picking items, including the device of FIG. 1, in accordance with some embodiments.
Figure 5:
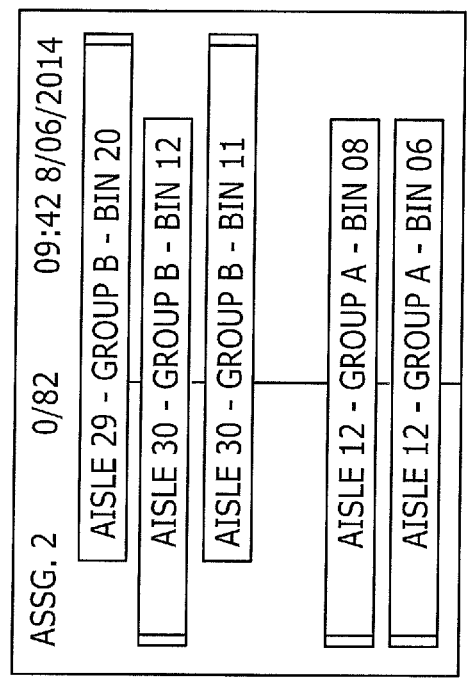
FIG. 5 is a view of a list of locations of items to be picked that can be rendered at a display of the device of FIG. 1, in accordance with some embodiments.

Hence, attention is next directed to FIG. 4 which depicts a system 400 comprising device 101, a server 401, an optional external location determining apparatus 403 and a plurality of locations 410-1, 410-2, 410-3, 410-4, 410-5, 410-6, 410-7, 410-8, 410-9, 410-10, 410-11, 410-12 (interchangeably referred to hereafter, collectively, as locations 410 and, generically, as a location 410), and one more destination locations 420-1, 420-2 (interchangeably referred to hereafter, collectively, as locations 420 and, generically, as a location 420). Each location 410 can store one or more items for pickup and can hence each comprise one or more bins, totes, storage areas and the like, storing items in a warehouse. Each location 420 can comprise a drop-off point for items picked up from locations 410, and can each comprise a conveyor, a shipping office and the like. In yet further implementations, one or more of locations 420 can be portable and/or moveable; for example, one or more of locations 420 can comprise a bin on a cart being pushed around by the picker carrying device 101.

Hence, system 400 and/or at least locations 410, 420 can comprise a warehouse environment; further server 401 can be configured to communicate wirelessly with device 101, for example to transmit lists of items to be picked up within system 400, including location sensitive data. Indeed, external location determining apparatus 403, so referred to as external location determining apparatus 403 is external to device 101, can also be in wireless communication with device 101. As such, and while not depicted, system 400 further comprises at least one communication network (interchangeably referred to hereafter as a network), compatible within interface 127 of device 101, and server 401.

While details of server 401 are not depicted, it is appreciated that server 401 comprises one or more servers, each comprising: a processor and a communication interface, each respectively similar to processor 120 and interface 127, though each of processor and interface of server 401 can be adapted for server functions rather than handheld device functions. Server 401 further comprises a memory and optionally a display, and input device and the like, and each can be respectively substantially similar to memory 122, display 126, and input device 128 though adapted for server functions. Server 401 is generally configured to communicate with device 101 for example to transmit lists of items to be picked up within system 400, including location sensitive data.

Similarly, external location determining apparatus 403 can also comprise one or more devices, each comprising: a processor and a communication interface, each respectively similar to processor 120 and interface 127, though each of processor and interface of apparatus 403 can be adapted for functionality of apparatus 403, rather than handheld device functions. Apparatus 403 further comprises a memory and optionally a display, and input device and the like, and each can be respectively substantially similar to memory 122, display 126, and input device 128 though adapted for functionality of apparatus 130. External location determining apparatus 403 is generally configured to determine a current location of device 101 within system 400 and can transmit the current location of device 101 thereto; in some implementations, external location determining apparatus 403 can also communicate with location determining devices distributed in system 400, for example BTLE tags, ultrasonic devices, WiFi Access points, and the like, to determine a current location of device 101 within system 400.

While only one device 101 is depicted in FIG. 4, system 400 can be adapted to include a plurality of devices, each similar to device 101, and each of server 401 and apparatus 403 can be configured to communicate with each of the plurality of devices, transmit respective lists of items to be picked thereto, including respective location sensitive data, and transmit a respective current location of each thereto. For example, system 400 can comprise a system of devices, each similar to device 101, and each assigned to a picker employed to pick items in a warehouse from locations 410 and deliver to another location. In other words each of the plurality of devices, including device 101, can be carried by a picker.

Further, while system 400 depicts twelve locations 410, and two locations 420, system 400 can comprise any number of locations 410, 420 that would be used, for example, in a warehouse environment.

While not depicted, items stored at locations 410 can each comprise graphical and/or optical code and/or electronic which can be scanned by scanning device 124. For example, each item can comprise a barcode and/or an RFID (radio frequency identification) tag and/or an NFC (near field communication) tag.

Further, while not depicted, system 400 can further comprise one or more devices configured to determine when and/or what item is picked. For example, such devices can be worn by a picker using device 101 and can include, but is not limited to one or more of: a surface electromyography (EMG) sensor configured to sensor muscle contraction in a forearm; and a body-worn imager/camera and/or or RFID/NFC reader to identify an item being picked by scanning a barcode, and the like, and/or a an RFID and/or NFC tag. In other words, such a body-worn imager/camera and/or or RFID/NFC reader can be used in place of and/or in conjunction with scanner device 124. For example, an imager/camera mounted on a picker's chest could be able to decode a barcode in its field of view and/or an NFC/RFID reader mounted on an arm/hand of a picker can be activated once a grab has been detected using an EMG device. Regardless, such devices can be in communication with device 101 and/or server 401, and data from devices configured to determine when and/or what item is picked can be processed at processor 120 and/or at server 401.

As also depicted in FIG. 4, server 401 can wirelessly transmit to device 101, location sensitive data 450 associated with at least one item to be picked within the warehouse. In some implementations, location sensitive data 450 can comprise information associated with one or more of a description of one or more items to be picked, a quantity of the one or more items to be picked, a location of the one or more items to be picked (also interchangeably referred to as a "pick location"), and location of where to bring the one or more items after they are picked (also interchangeably referred to as a "place location"). For example, each of locations 410 can comprise a respective pick location while each of locations 420 can comprise a respective place location and/or drop-off location.

Each of pick locations and place locations can be described with respect to a code, a number, a bin number and the like, and each of pick locations and place locations can be mapped, in memory 122 of device 101 and/or in a memory of server 401, to a coordinate system as described above.

Attention is next directed to Table 1 which depicts a non-limiting example of location sensitive data 450 used to assign a picker to pick 2 items, identified by a number 100-91350000-60, and a picture thereof ("item.jpg"), from a location 410, which is identified by a number 001-A67-BC5D, and bring the 2 items to a location 420 identified by an identifier "Bin C":

TABLE 1

| | |
|---|---|
| Pick Location | 001-A67-BC5D |
| Picture (optional) | item.jpg |
| Item Number | 100-91350000-60 |
| Quantity | 2 |
| Place Location | Bin C |

While Table 1 is arranged in rows and columns, with the left hand column identifying types of data located in data fields in the right hand column, location sensitive data 450 can be arranged in any suitable format, and device 101 can be configured to process the format of location sensitive data 450 to determine which field represents which data. Furthermore, while each field of Table 1 is labeled to identify a type of data stored therein, in other implementations, the labels can be omitted, with an order of the data fields and/or a position of the data fields, being indicative of data type. Furthermore, each set of data in each data field can be interchangeably referred to as a subset of location sensitive data 450. It is further assumed that the picture "item.jpg" is transmitted in location sensitive data 450.

While not depicted, location sensitive data 450 can further include an aisle number identifying an aisle in a warehouse where items to be picked are stored, a group number identifying an area of an aisle where the items are stored, and/or a bin number identifying a bin in the group where the items are stored; however, other location sensitive data 450 is within the scope of present implementations.

Each subset of location sensitive data 450 can be associated with a respective threshold difference between a current location of device 101 and a location of the at least one item that is being described by location sensitive data 450. Such thresholds can be expressed in absolute terms or relative terms. Further, each respective threshold difference can be provided in location sensitive data 450, and/or respective threshold differences can be stored at device 101: for example, each data field of location sensitive data 450 can be associated with a respective threshold difference either at server 401, with each respective threshold difference being transmitted to device 101 in location sensitive data 450, or device 101 can assign the respective threshold difference when location sensitive data 450 is received.

For example, attention is next directed to Table 2, which is similar to Table 1, but with respective threshold differences associated with each subset of location sensitive data 450, as located in the right hand column:

TABLE 2

| | | |
|---|---|---|
| Pick Location | 001-A67-BC5D | 100% of difference |
| Picture (optional) | item.jpg | 20% of difference |

TABLE 2-continued

| Item Number | 100-91350000-60 | 20% of difference |
| Quantity | 2 | 10% of difference |
| Place Location | Bin C | 3% of difference |

In this example, each respective threshold difference is expressed in term of a percentage of a difference between a current location of device 101 and a location of the associated 2 items to bee picked up. However, in other implementations, such respective threshold differences can be expressed in terms of a distance between a current location and the location of the associated 2 items to bee picked up, for example in meters and/or feet and/or inches and the like. In yet further implementations, rather than threshold differences, one or more of the respective thresholds can be used, for example, expressed with respect to motion of device 101 (e.g. a threshold rate of motion, and/or a threshold velocity and/or a threshold acceleration of device 101). In yet further implementations, rather than threshold differences, one or more of the respective thresholds can be used, for example, expressed with respect to a step in a workflow of device 101: for example when items are being picked, and device 101 is generally stationary, a respective threshold can be expressed with regards to numbers of items picked, percentages of a total quantity of items to be picked and the like. In some of these implementations, a threshold can comprise "100% of items picked" so that when all items at a location are picked, instructions at display 126 can be updated accordingly.

Hence, with reference to FIG. 4, either device 101 can determine its own current location using location determining apparatus 130, or external location determining apparatus 403 can transmit a current location 460 of device 101 to device 101. As described above, current location 460 can be determined periodically, either at device 101, or by receiving current location 460 from external location determining apparatus 403. Further, processor 120 can determine a relative location of current location 460 to a location of items to be picked up by comparing current location 460 to a pick location received in location sensitive data 450. However, as such a pick location can be represented by a number (e.g. "001-A67-BC5D", as in Tables 1 and 2), numbers of pick locations can be mapped and/or converted to a similar coordinate system used to express and/or define current location 460; such mapping and/or conversion can occur at device 101 (presuming a mapping algorithm and/or a conversion algorithm has been provisioned at device 101) and/or at server 401; when such mapping and/or conversion can occur at device 101, the mapped and/or converted coordinates can be transmitted in location sensitive data 450.

In any event, processor 120 can determine a difference between current location 460 and a location of items to be picked up and populate the respective threshold differences accordingly. Use of such threshold differences will be described in further detail below.

While only one set of location sensitive data 450 is described with respect to Tables 1 and 2, server 401 can transmit a list of items in location sensitive data 450, each set of items in the list located at a same location.

Indeed, prior to providing and/or updating instructions for picking items from a warehouse, display 126 can be controlled by processor 120 to render a list of the items to be picked in a picking order. For example, attention is directed to FIG. 5, which depicts a view 500 of a graphic user interface (GUI) which can be rendered at display 126, view 500 comprising a list of locations of items to be picked, in an order to be picked, the locations formatted in terms of an aisle number, a group number and a bin number, as placed into a respective graphical box, though other formats for the locations are within the scope of present implementations. View 500 can also include, as depicted, an assignment number ("Assgn. 2") which comprises a reference for a number of an assignment given to a picker using device 101, a number of locations from which items are to be picked in the assignment ("82", along with the number of locations already visited (presently "0", formatted as "0/82"), a time and a date. In some implementations, view 500 can be zoomed into and/or out of at display 126, for example by using touchscreen gesture input and/or by receiving input at input device 128. It is further appreciated that a location of each respective graphical box relative to a centre of view 500 can further provide a graphical indication of a location of respective items within a warehouse; for example, when a respective graphical box is shifted towards a left side of display 126, a respective location can be on a left side of a warehouse, etc.

Figure 6:
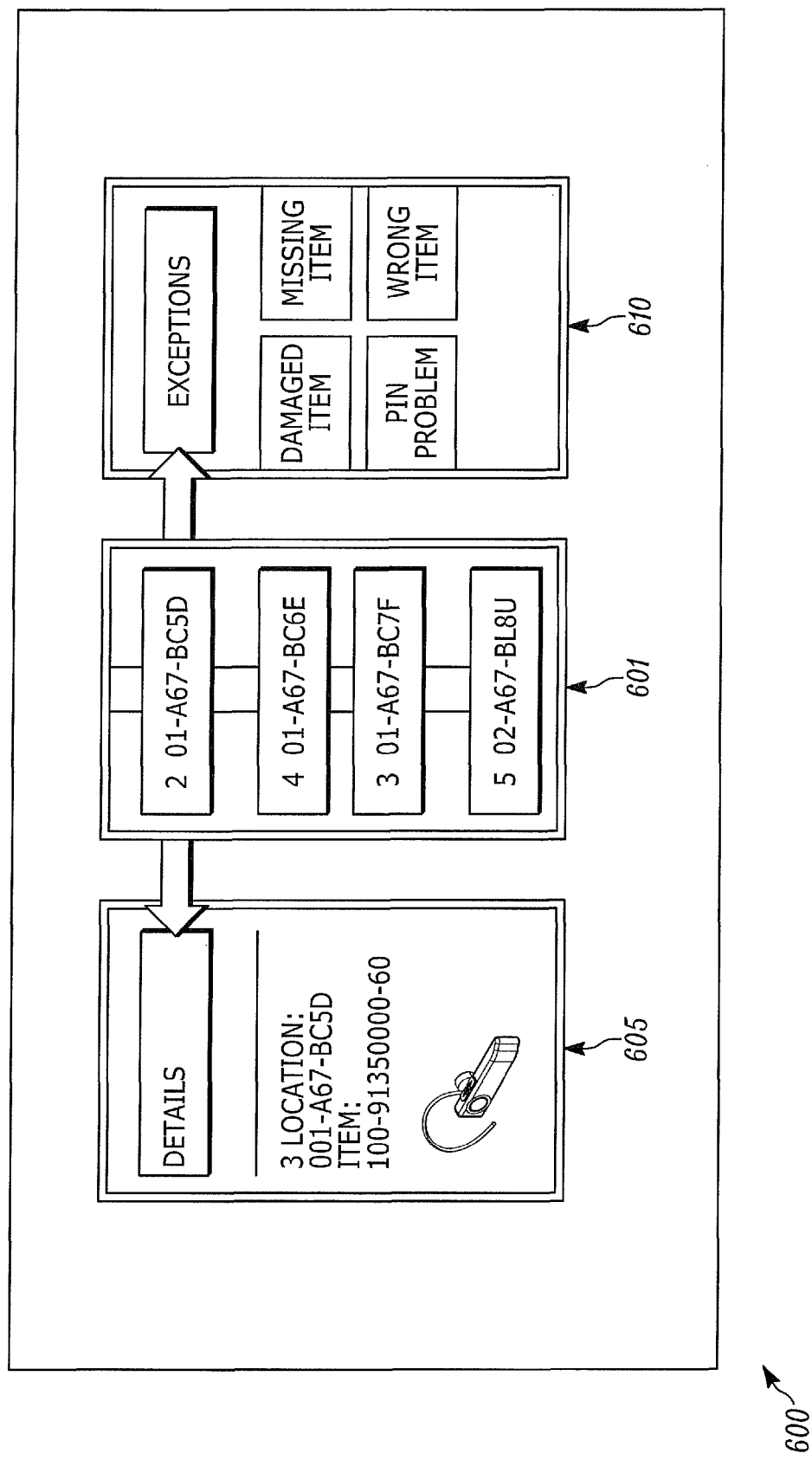
FIG. 6 is an alternative view of a list of locations of items to be picked that can be rendered at a display of the device of FIG. 1, in accordance with some embodiments.

Attention is directed to FIG. 6, which depicts a view 600 of an alternative GUI which can be rendered at display 126, view 600 comprising a list 601 of locations of items to be picked, in the centre, in an order to be picked, the locations formatted in terms of a number (e.g. 01-A67-BC5, 01-A67-BC6E, 01-A67-BC7F, 02-A67-BL8U etc , list 601 including a number of each items to be picked at each respective location (e.g. 2, 4, 3, 5), each location and number of items grouped together in a respective graphical box. List 601 can correspond to the first four items depicted in view 500, though with location differently formatted. Furthermore, each of the items in list 601, as depicted, is rendered in a size that depends on a number of the items located at a same location. For example, as depicted, a height of each respective graphical box is proportional to the number of respective items: i.e. the last graphical box indicating 5 items is about 2.5 larger than the first graphical box indicating 2 items.

As depicted, view 600 further shows optional views 605, 610 which can either be rendered adjacent list 601, or rendered when rows and/or graphical boxes in list 601 are selected. View 605 provides details about respective items in list 601, while view 610 comprises graphical buttons which can be selected when respective items are picked to indicate problems and/or exceptions in the picking, including items being damaged, missing, wrong items at a location and/or problems with the location (e.g. "bin problem").

Hence, in views 500, 600, picks are presented in a graphical format, with a present pick positioned at the top of the display area, and a remainder of display 126 can comprise upcoming pick information, such as a next 5 picks. An amount of detail presented for each line item can optionally be configured by a picker using, for example, touch screen gestures (e.g. pinch to zoom out for only location codes but next 10 picks, or zoom in to see next 3 picks but product pictures, for example). This enables proficiency level adjustment based on a picker's performance capacity and can lead to high performance status at the pace of a picker's cognitive adaptability A level of detail can optionally be altered automatically by context (e.g. when looking for a specific item more details shown, when walking, more upcoming picks are shown). In some implementations, spacing between the pick items in the list can optionally provide indication of relative distance between items. Hence, items that are close together in the warehouse can benefit from an efficiency boost by not having the picker return to the cart/truck to find out that the next pick was close to where they were. Periods of longer travel time can hence be visible, in advance, to the picker, allowing a picker to potentially make better use of this dead time (e.g. fix their positioning during travel time rather than between close picks).

Pick items can optionally be adjusted left or right at display 126 to indicate which side of the aisle an item is located. Size of item at display 126 can optionally indicate relative quantity to be picked. Relative shelf height can also be indicated, reducing cognitive load having visibility ahead.

Furthermore, additional picks can be added to the pick list and can be visually shown in the list as being new or added. Such additional picks can comprise picks from other pickers' orders, and can be rendered separately at display 126 from the picker's pick list.

In yet further implementations, a picker interacting with the pick list can also re-order the pick list; alternatively, device 101 can receive an indication from server 401 to reorder the pick list, including, but not limited to, reordering the pick list to show and/or emphasize a new and/or immediate pick.

Figure 7:
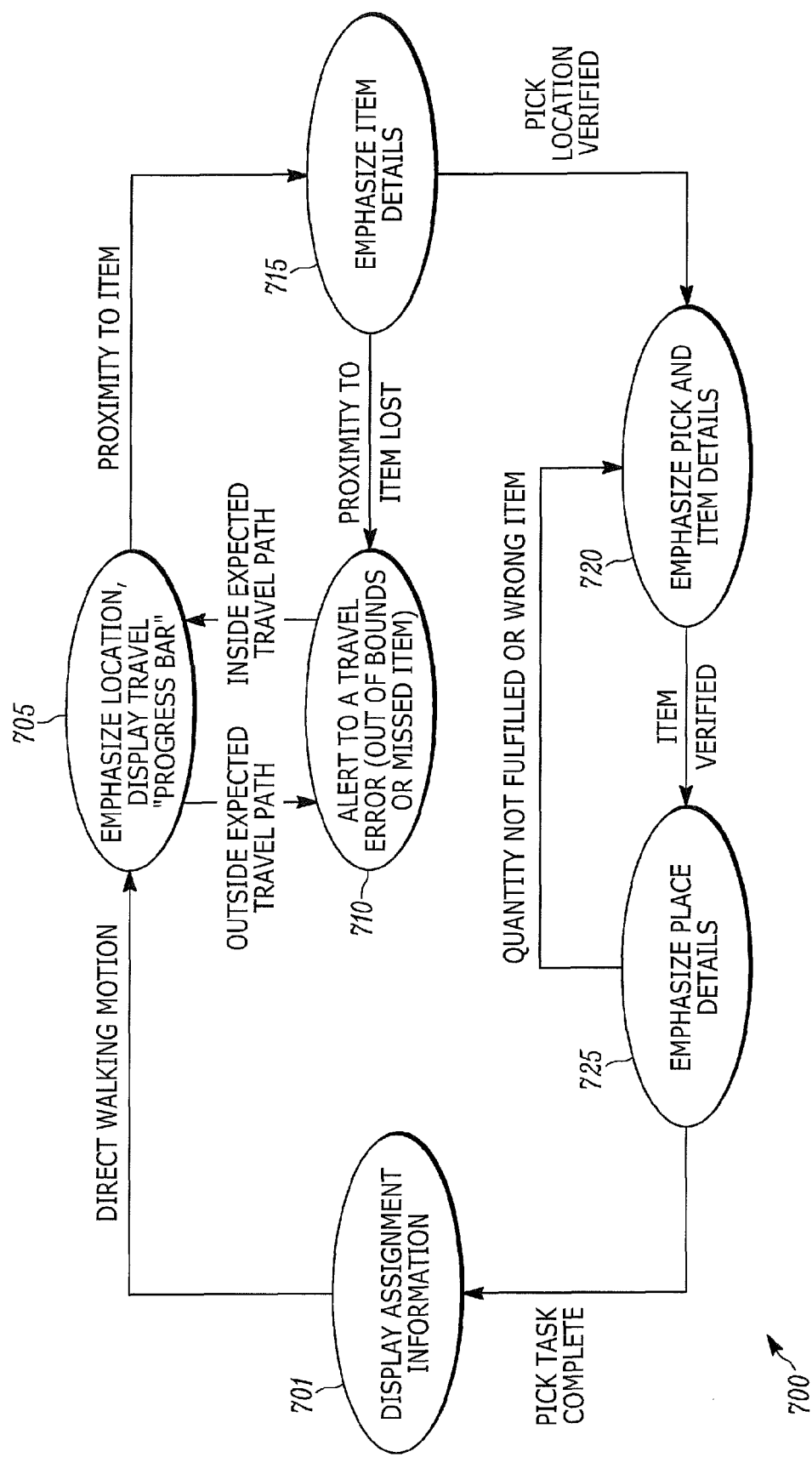
FIG. 7 is a block diagram of a flow chart of an alternate method for picking items, in accordance with some embodiments.

Attention is next directed to FIG. 7 which depicts a method 700 that is at least partially analogous to method 300. Method 700 can be implemented at processor 120, as with method 300. In order to assist in the explanation of method 700, it will be assumed that method 700 is performed using device 101, and specifically by processor 120 of device 101. Indeed, method 700 is one way in which device 101 can be configured. Furthermore, the following discussion of method 700 will lead to a further understanding of device 101, and its various components. However, it is to be understood that device 101 and/or method 700 can be varied, and need not work exactly as discussed herein in conjunction with each other, and that such variations are within the scope of present implementations.

Regardless, it is to be emphasized, that method 700 need not be performed in the exact sequence as shown, unless otherwise indicated; and likewise various blocks may be performed in parallel rather than in sequence; hence the elements of method 700 are referred to herein as "blocks" rather than "steps". It is also to be understood, however, that method 700 can be implemented on variations of device 101 as well.

At block 701, processor 120 controls display 126 to display to render assignment information; block 701 can include receiving location sensitive data 450, and hence, block 701 can include block 301 of method 300. Walking motion can then be detected, for example by determining changes in a current location of device 101 and, in response, at block 705, processor 120 can control display 126 to render location sensitive data 450, with a pick location emphasized and optional progress bar displayed. Display 126 can alternatively be updated on the basis of motion related thresholds. As a current location can be periodically determined at device 101, processor 120 can also determine whether device 101 is outside an expected travel path (e.g. a shortest path from a current location to the location of the item(s)) and/or inside the expected travel path. When outside, at an optional block 710, processor 120 can provide an alert, including, but not limited to at display 126, and when block 710 is implemented, processor 120 can again implement block 705 when back inside the expected travel path. Indeed, block 710 can be implemented whenever device 101 is outside an expected travel path. Indeed, processor 120 can determine an expected travel path and determine whether device 101 is within a given threshold distance of the expected travel path. Hence, the instructions rendered at display 126 can be updated based on an expected travel path and/or a trajectory of device 101 (e.g. a path of device 101 through system 400).

As device 101 continues to travel closer to an item location, display 126 can be updated. For example, when proximity to an item is determined, again based on a current location of device 101 relative to an item location, at block 715 processor 120 can control display 126 to render emphasized item details. For example, processor 120 can determine a current difference between the current location of device 101 and the location of the at least one item in the warehouse, and processor 120 can further determine that the current difference is between a respective threshold difference of a subset of location sensitive data 450 and a next threshold difference of a next subset of location sensitive data 450. For example, processor 120 can compare the current difference to data similar to the right hand column of Table 2 and determine where the current difference falls in the respective threshold differences, and emphasize the subset of location sensitive data 450 at display 126 that corresponds to the respective threshold difference that is greater than the current difference but closest to the current difference.

When proximity of item is "lost" and/or the item is no longer proximal device 101, (e.g. as determined at processor 120 by comparing a current location to a location of the items to be picked and/or by comparing a current difference current difference between the current location of device 101 and the location of the items to be picked) block 710 can be repeated. For example, a picker can erroneously carry device 101 away from the items to be picked.

However, when a pick location is verified, for example again by comparing by comparing a current location to a location of the items to be picked and/or a current difference between the current location of device 101 and the location of the at least one item in the warehouse, at block 720, processor 120 can control display 126 to emphasize pick details and/or item details, again based on data similar to Table 2.

In other words, a picker is now adjacent an item to be picked, and can proceed to pick the item and/or items in order to carry them to a drop-off location and the like. As the picker picks each item, whether an item has been picked can be verified at processor 120 either by the picker interacting with input device 128 and/or barcode, and the like, of the item being scanned using scanning device 124 and/or using the body-worn devices described above. Processor 120 can update data being provided at display 126 so that when the at least one item being picked comprises two or more items at a same location, and when the current location is within a threshold distance of the same location, a count of a number of the two or more items that are remaining to be picked at the same location are rendered at display 126. When a quantity is not yet at an order quantity (e.g. as in list 601, two items are to be picked at location 01-A67-BC5D, hence two can be the order quantity), the pick details and/or item details can be updated accordingly at block 720 until the number of items that are picked reaches the order quantity.

When problems with an item at location 410-3 are determined and/or problems with location 410-3 are determined, processor 120 can be used to control display 126 to render view 610 so that such problems can be recorded and/or advance the quantity accordingly (e.g. when 3 items are in the order, but only 2 items are available, the virtual button "Missing Item" can be selected to advance the quantity and/or end block 720 and/or block 725).

Otherwise, when an item is verified and/or a number of items picked reaches an order quantity, at block 725 processor 120 can control display 126 to emphasize place details, i.e. details of a drop-off location. Once a pick task is complete (i.e. it is determined that device 101 is proximal a place location and/or a drop-off location, and/or it is determined that the items being picked have been dropped off at a drop-off location), at block 701, processor 120 can update display 126 to render a next assignment.

In any event, each of blocks 705, 715, 720, 725 can correspond to block 303 as in each of blocks 705, 715, 720, 725, instructions for picking items are updated to emphasize subsets of location sensitive data based on a current location of mobile device 101 relative to a location of at least one item.

Figure 8:
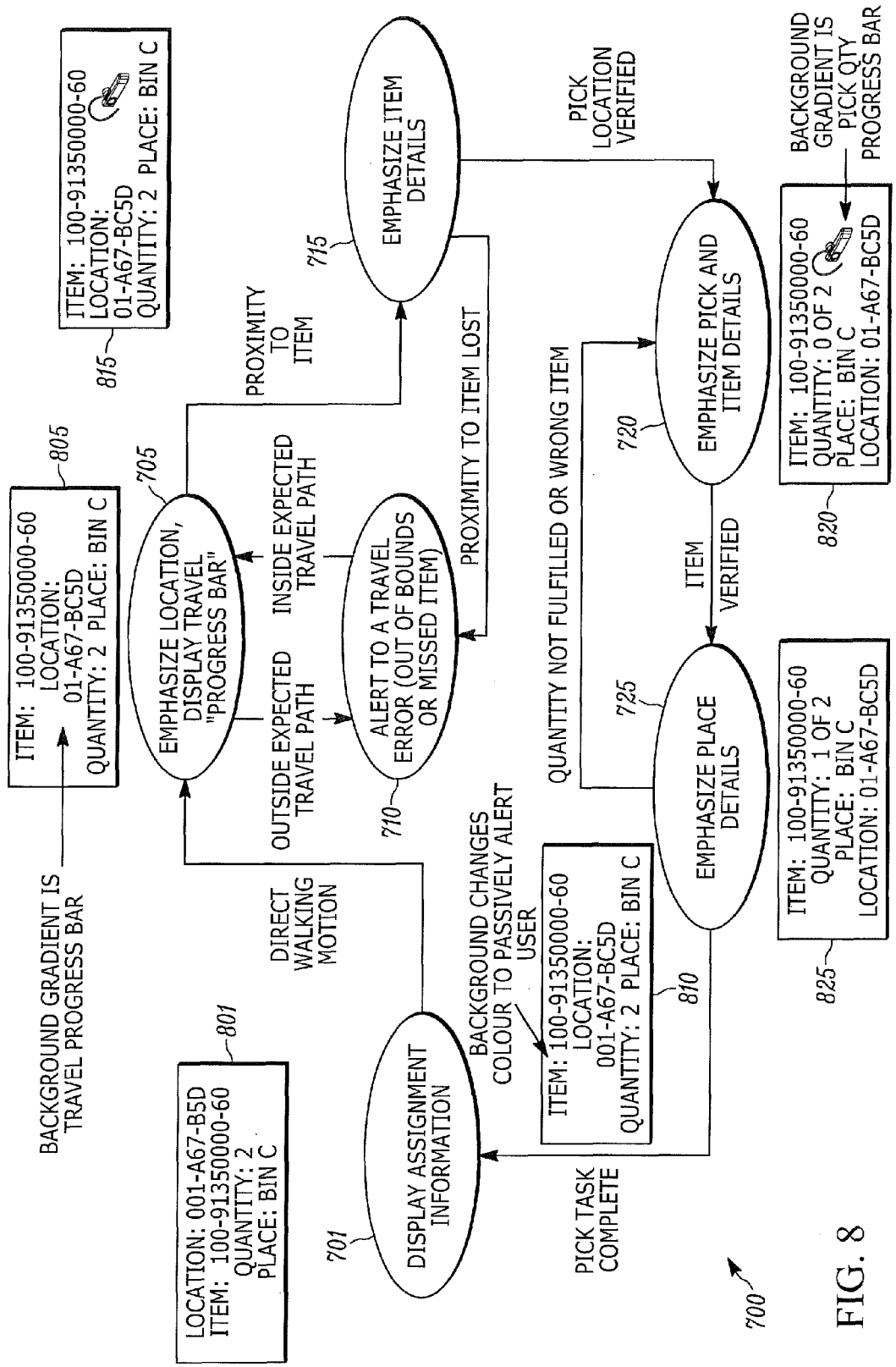
FIG. 8 depicts the method of FIG. 7, with views of location sensitive data with emphasized subsets that depend on, in accordance with some embodiments.
Figure 9:
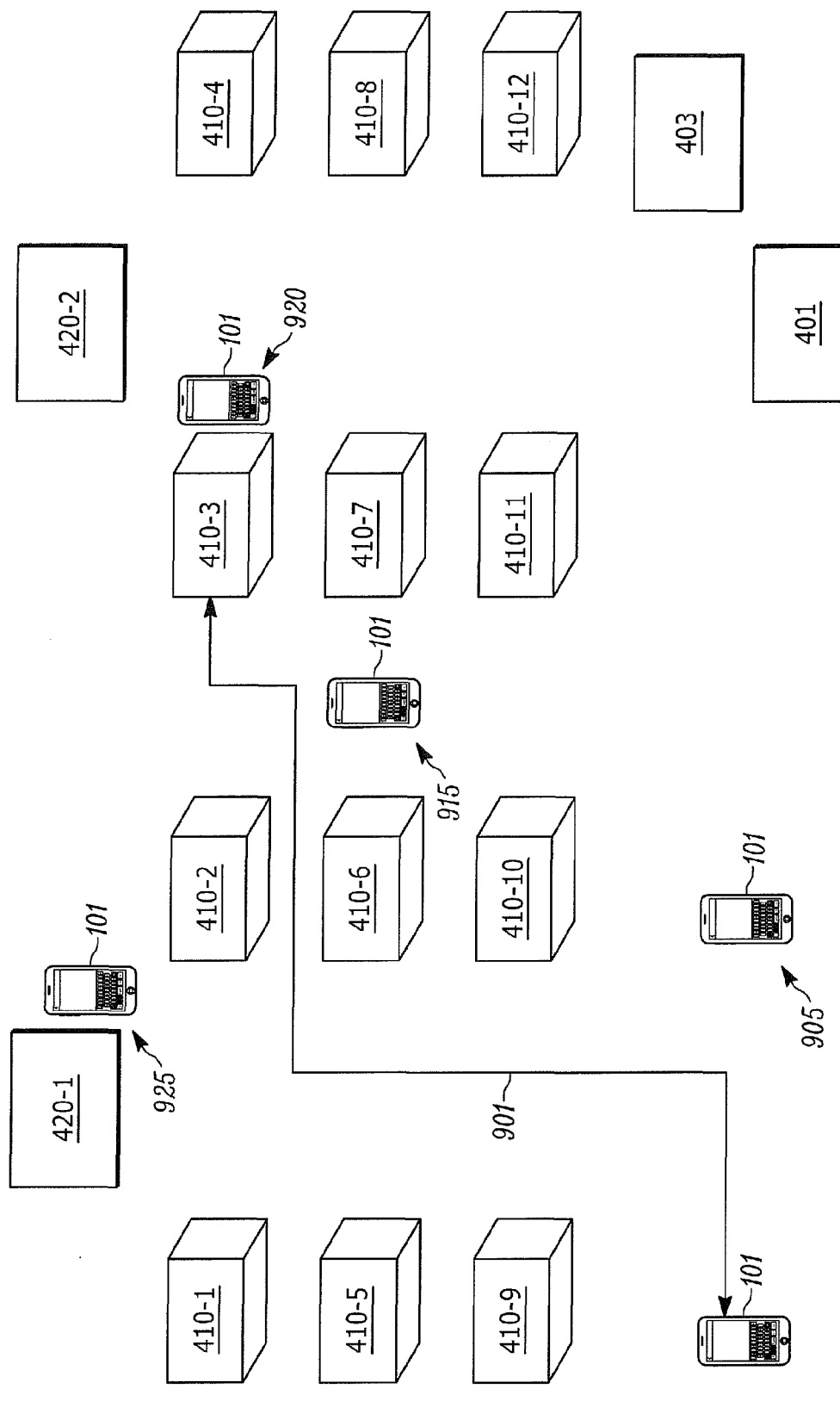
FIG. 9 depicts the system of FIG. 4 with device 101 at different locations therein, in accordance with some embodiments.
Figure 10:
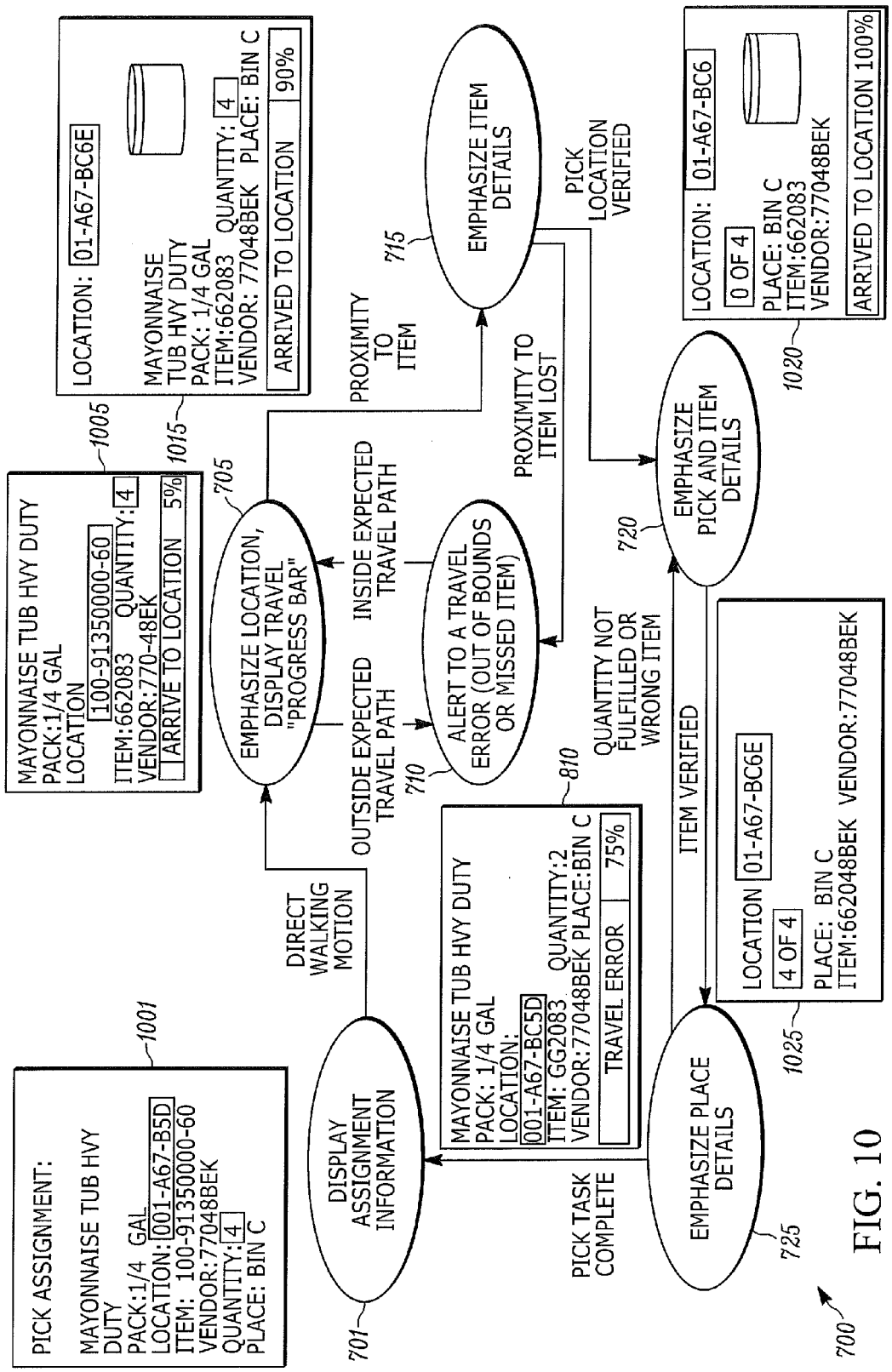
FIG. 10 depicts the method of FIG. 7, with views of location sensitive data with emphasized subsets that depend on location, in accordance with some alternative embodiments.

Attention is next directed to FIG. 8, which depicts method 700 along with views 801, 805, 810, 815, 820, 825 of display 126 that can respectively occur at each of blocks 701, 705, 710, 715, 720, 725. FIG. 8 will be described in conjunction with FIG. 9, which is substantially similar to FIG. 4, with like elements having like numbers. In FIGS. 8 and 9 it is assumed that device 101 has received location sensitive data 450 and is being carried by a picker to collect items from a location designated by a number "001-A67-BC5D" which, for the present example, is assumed to correspond to location 410-3. It is further assumed in FIGS. 8 and 9 that processor 120 has access to a current location of device 101, as described above.

In particular, view 801 can be provide after one or more of view 500 and view 600, when, at block 701, a particular assignment is being undertaken by device 101 to, for example pick two items from location 001-A67-BC5D. View 801, and indeed, each of views 801, 805, 810, 815, 820, 825, is provided in a card format in which information from Table 1 and/or Table 2 is rendered in a box at display 126. For example, in view 801, which can be provided on top of one or more of views 500, 600 and/or replace one or more of views 500, 600 at display 126, a location of items, an item number and/or item identifier, a quantity of the items, and a destination/place to bring the items once picked can be provided.

Initially, with reference to FIG. 9, processor 120 can determine a difference 901 between an initial current location of device 101 and location 410-3. As processor 120 detects motion and/or walking, for example, device 101 is transported to an intermediate location 905 along an expected travel path, that is between 100% and about 20% of difference 901, at block 705, processor 120 controls display 126 to emphasize the pick location 001-A67-BC5D, as in view 805 where the location number is rendered in a font larger than the font of other text in view 805. In some implementations, a font size of data being emphasized can be proportional to a walking speed.

As depicted, the background of view 805 can be controlled to show a progress bar and/or a travel progress bar by controlling shading of the background.

If device 101 strays from an expected travel path, at block 710, processor 120 controls display 126 to change a background color of view 805, as in view 810, to provide a passive alert to the picker that the picker has strayed from an expected travel path. However, other forms of alerts are within the scope of present implementations, including, but not limited to, rendering of alert boxes, rendering of alert icons, and the like.

Presuming device 101 continues on an expected path, once device 101 is approaching location 410-3, for example at a location 915 that is about 20% of difference 901, at block 715, processor 120 controls display 126 to emphasize the item details, as in view 815 where a font of an item number is rendered in a font larger than the font of other text in view 815, other than a font of the item location, as well as a picture of the item to be picked.

Once device 101 is adjacent location 410-3, for example at location 920 that is about 5% of difference 901, at block 720, processor 120 controls display 126 to emphasize the pick details and/or item details, as in view 820, where a font of a number of items to be picked, and a font of an item number, is rendered in a font larger than the font of other text in view 820, as well as a picture of the item to be picked. Indeed, previously emphasized data can be deemphasized: for example, location 01-A67-BC5D has been deemphasized in view 820 as compared to view 815. The progress bar represented by the background of view 820 can change to a pick quantity progress bar. It is further assumed in view 820 that zero of two items are initially picked.

Once at least one item is picked, view 820 can be updated as in view 825 to show a number of items that have been picked and/or a number of items remaining to be picked, as well as an emphasis of a drop-off location, for example "Bin C", which can correspond to one of locations 420, for example location 420-1. The pick quantity progress bar can be updated to reflect the count of items picked and/or a number of items remaining to be picked. In any event, once all items are picked (e.g. quantity is updated to 2 of 2), and device 101 is at location 925 proximal location 420-1 (i.e. the place location), and/or a pick task is complete, processor 120 can control display 126 to render a next assignment and/or a next set of items to be picked. Hence, comparing views 820, 825, instructions provided at display 126 can be updated on where device 101 is in an item picking workflow. In other words, as the number of items picked increases, with device 101 being generally stationary, views 820, 825 are updated based on an item-picking workflow (i.e. the quantity and/or the taskbar is updated).

For example, attention is next directed to FIG. 10 which again depicts method 700 along with views 1001, 1005, 1010, 1015, 1020, 1025 of display 126 that can respectively occur at each of blocks 701, 705, 710, 715, 720, 725. Views 1001, 1005, 1010, 1015, 1020, 1025 respectively correspond to views 801, 805, 810, 815, 820, 825, with information associated with a next items to be picked depicted (e.g. as in views 500, 600), however in a different format. In practice each picking assignment in system 400 will generally have the same format, but views 1001, 1005, 1010, 1015, 1020, 1025 are provided in contrast to views 801, 805, 810, 815, 820, 825 to show that many formats of how data is rendered to emphasize subsets of location sensitive data 450 are within the scope of present implementations.

In particular, a progress bar in views 1005, 1010, 1015, 1020 is provided as a distinct graphical progress bar and not by controlling background shading. Descriptive details of progress can also be provided in the progress bar, including alerts as in view 1010 (i.e. "Travel Error"), and updates on proximity ("Arrive to Location" and "Arrived at location" as in views 1010/1015, 1020, respectively). Furthermore, details of items to be picked, as at view 1015, can include textual descriptive items and not simply an item number. Otherwise subsets of location sensitive data 450 are emphasized depending on a current location of device 101 relative to a location of items to be picked.

Figure 11:
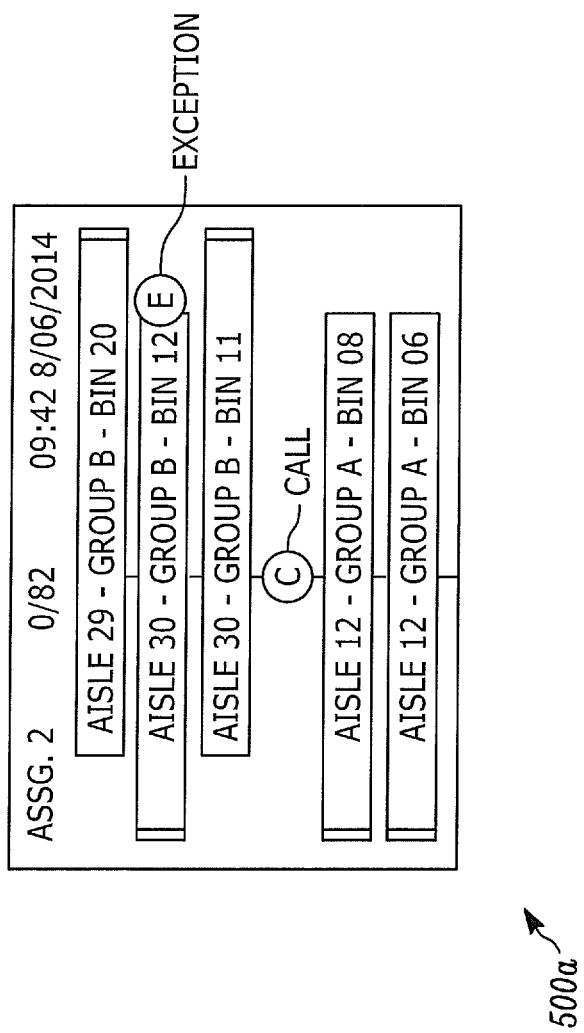
FIG. 11 depicts the list of FIG. 5 updated to show icons indicating an exception and a call, accordance with some alternative embodiments.

In some implementations device 101 can be configured to collect location sensitive data within system 300, including, but not limited to where and/or when calls were made from and/or to device 101, where and/or when texts and/or messages occurred, where and/or when exceptions occurred in picking items (i.e. an order could not be expressly fulfilled), and the like. Such location sensitive data can be transmitted to server 401 for collection and/or collation and/or used to produce reports for device 101, for example, regarding events that occurred when items where being picked; such reports can be generated and transmitted to devices associated with managers and the like. In some implementations, processor 120 can control display 126 to provide indications of such data, For example, attention is directed to FIG. 11, which depicts a view 500s of a GUI which can be rendered at display 126. View 500 comprises view 500a updated to show respective icons that indicated an exception ("E") that occurred when items in aisle 30/group B/bin 12 were picked, and a call ("C") that was made between picking items. The exceptions can occur when one or virtual buttons in view 610 are selected during a pick event.

In any event, described herein is a method, system and apparatus in which instructions are provided for picking items in a warehouse, the instructions updated to highlight different subsets of the location sensitive data based on a current location of a mobile device relative to a location of the at least one item in the warehouse. For example, location sensitive data in the instructions can be associated with threshold distances and subsets of the location sensitive data can be emphasized once a respective threshold distance is reached. Such an automatic emphasis of data can save valuable time within a warehouse environment. Furthermore resources can be saved within the warehouse environment, for example by preventing messages from being transmitted to devices of pickers who go off path, and/or by increasing efficiency within the warehouse environment.

In the foregoing specification, specific embodiments have been described. However, one of ordinary skill in the art appreciates that various modifications and changes can be made without departing from the scope of the invention as set forth in the claims below. Accordingly, the specification and Figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of controlling picking of items in a warehouse comprising:
    receiving, at processor of a mobile device, using a communication interface of the mobile device, location sensitive data associated with at least one item to be picked within the warehouse, the mobile device comprising the processor, the communication interface and a display;
    rendering, at the display using the processor, instructions for picking the at least one item in the warehouse, the instructions including the location sensitive data, the instructions updated to emphasize different subsets of the location sensitive data based on a current location of the mobile device relative to a location of the at least one item in the warehouse; and,
    prior to rendering the instructions, rendering at the display a list of the items to be picked in a picking order, each of the items in the list rendered in a size that depends on a number of the items located at a same location.

2. The method of claim 1, further comprising determining the current location of the mobile device by one or more of: receiving, at the processor, the current location from a location determining apparatus of the mobile device; and, receiving, at the processor, using the communication interface, the current location from an external location determining apparatus.

3. The method of claim 1, wherein the location sensitive data associated with at least one item comprises the location of the at least one item in the warehouse, the method further comprising determining the location of the at least one item in the warehouse by processing, at the processor, the location sensitive data.

4. The method of claim 1, wherein each subset of the location sensitive data is associated with a respective threshold difference between the current location of the mobile device and the location of the at least one item in the warehouse, the instructions updated to emphasize a respective subset of the location sensitive data when a current difference between the current location of the mobile device and the location of the at least one item in the warehouse is between the respective threshold difference and a next threshold difference of a next subset.

5. The method of claim 1, wherein the instructions are updated to emphasize different subsets of the location sensitive data based on a current location of the mobile device relative to a location of the at least one item in the warehouse by one or more of: changing a size of an emphasized subset to be larger than a size of remaining subsets rendered at the display; changing a font size of the emphasized subset to be larger than a font size of the remaining subsets rendered at the display; and rendering the emphasized subset in about a center of the remaining subsets rendered at the display.

6. The method of claim 1, wherein the instructions are further updated to emphasize different subsets of the location sensitive data based on one or more of motion of the mobile device, a trajectory of the mobile device, and a workflow associated with the mobile device.

7. The method of claim 1, further comprising rendering a progress bar at the display, the progress bar updated to indicate one or more of: a relative distance between the current location of the mobile device and the location of the at least one item in the warehouse; and a progress of the picking of the at least one item in the warehouse.

8. The method of claim 1, wherein when the at least one item being picked comprises two or more items at a same location, and when the current location is within a threshold distance of the same location, rendering at the display a count of a number of the two or more items that are remaining to be picked at the same location.

9. A mobile device for controlling picking of items in a warehouse comprising:
    a processor;
    a communication interface; and
    a display;
    the processor configured to:
        receive, using the communication interface, location sensitive data associated with at least one item to be picked within the warehouse;
        render, at the display, instructions for picking the at least one item in the warehouse, the instructions including the location sensitive data, the instructions updated to emphasize different subsets of the location sensitive data based on a current location of the mobile device relative to a location of the at least one item in the warehouse; and
        prior to rendering the instructions, render at the display a list of the items to be picked in a picking order, each of the items in the list rendered in a size that depends on a number of the items located at a same location.

10. The mobile device of claim 9, wherein the processor is further configured to determine the current location of the mobile device by one or more of: receiving the current location from a location determining apparatus of the mobile device; and, receiving, using the communication interface, the current location from an external location determining apparatus.

11. The mobile device of claim 9, wherein the location sensitive data associated with at least one item comprises the location of the at least one item in the warehouse, and the processor is further configured to determine the location of the at least one item in the warehouse by processing the location sensitive data.

12. The mobile device of claim 9, wherein each subset of the location sensitive data is associated with a respective threshold difference between the current location of the mobile device and the location of the at least one item in the warehouse, and wherein the processor is further configured to update the instructions to emphasize a respective subset of the location sensitive data when a current difference between the current location of the mobile device and the location of the at least one item in the warehouse is between the respective threshold difference and a next threshold difference of a next subset.

13. The mobile device of claim 9, wherein the processor is further configured to update the instructions to emphasize different subsets of the location sensitive data based on a current location of the mobile device relative to a location of the at least one item in the warehouse by one or more of: changing a size of an emphasized subset to be larger than a size of remaining subsets rendered at the display; changing a font size of the emphasized subset to be larger than a font size of the remaining subsets rendered at the display; and rendering the emphasized subset in about a center of the remaining subsets rendered at the display.

14. The mobile device of claim 9, wherein the processor is further configured to update the instructions to emphasize different subsets of the location sensitive data based on one or more of motion of the mobile device, a trajectory of the mobile device, and a workflow associated with the mobile device.

15. The mobile device of claim 9, wherein the processor is further configured to render a progress bar at the display, the progress bar updated to indicate one or more of: a relative distance between the current location of the mobile device and the location of the at least one item in the warehouse; and a progress of the picking of the at least one item in the warehouse.

16. The mobile device of claim 9, wherein the processor is further configured to render the instructions at the display in a card format.

17. The mobile device of claim 9, wherein the processor is further configured to: when the at least one item being picked comprises two or more items at a same location, and when the current location is within a threshold distance of the same location, render at the display a count of a number of the two or more items that are remaining to be picked at the same location.

18. A method of controlling picking of items in an environment comprising:
receiving, at processor of a mobile device, using a communication interface of the mobile device, location sensitive data associated with at least one item to be picked within the environment, the mobile device comprising the processor, the communication interface and a display; and,
rendering, at the display using the processor, instructions for picking the at least one item in the environment, the instructions including the location sensitive data, the instructions updated to emphasize different subsets of the location sensitive data based on a current location of the mobile device relative to a location of the at least one item in the environment,
wherein each subset of the location sensitive data is associated with a respective threshold difference between the current location of the mobile device and the location of the at least one item in the environment, the instructions updated to emphasize a respective subset of the location sensitive data when a current difference between the current location of the mobile device and the location of the at least one item in the environment is between the respective threshold difference and a next threshold difference of a next subset.

19. The method of claim 18, further comprising, when the at least one item being picked comprises two or more items at a same location, and when the current location is within a threshold distance of the same location, rendering at the display a count of a number of the two or more items that are remaining to be picked at the same location.

20. The method of claim 18, further comprising, prior to rendering the instructions, rendering at the display a list of the items to be picked in a picking order, each of the items in the list rendered in a size that depends on a number of the items located at a same location.

21. A mobile device for controlling picking of items in an environment comprising:
a processor;
a communication interface; and
a display;
the processor configured to:
receive, using the communication interface, location sensitive data associated with at least one item to be picked within the environment; and,
render, at the display, instructions for picking the at least one item in the environment, the instructions including the location sensitive data, the instructions updated to emphasize different subsets of the location sensitive data based on a current location of the mobile device relative to a location of the at least one item in the environment,
wherein each subset of the location sensitive data is associated with a respective threshold difference between the current location of the mobile device and the location of the at least one item in the environment, and wherein the processor is further configured to update the instructions to emphasize a respective subset of the location sensitive data when a current difference between the current location of the mobile device and the location of the at least one item in the environment is between the respective threshold difference and a next threshold difference of a next subset.

22. The mobile device of claim 21, wherein the processor is further configured to, when the at least one item being picked comprises two or more items at a same location, and when the current location is within a threshold distance of the same location, render at the display a count of a number of the two or more items that are remaining to be picked at the same location.

23. The mobile device of claim 21, wherein the processor is further configured to prior to rendering the instructions, render at the display a list of the items to be picked in a picking order, each of the items in the list rendered in a size that depends on a number of the items located at a same location.

* * * * *